(12) United States Patent
Kurple et al.

(10) Patent No.: US 6,918,956 B2
(45) Date of Patent: Jul. 19, 2005

(54) BINDER FOR AGGREGATE, FOUNDRY CORES, AND OTHER PRODUCTS

(76) Inventors: Karl Vincent Kurple, P.O. Box 123, Anchorville, MI (US) 48004; Kenneth R. Kurple, deceased, late of Anchorville, MI (US); by Concetta Kurple, legal representative, P.O. Box 123, Anchorville, MI (US) 48004

( * ) Notice: Subject to any disclaimer, the term of this patent is extended or adjusted under 35 U.S.C. 154(b) by 69 days.

(21) Appl. No.: 10/352,370

(22) Filed: Jan. 27, 2003

(65) Prior Publication Data

US 2004/0055510 A1 Mar. 25, 2004

Related U.S. Application Data

(60) Provisional application No. 60/351,610, filed on Jan. 25, 2002.

(51) Int. Cl.$^7$ ............................. C08L 97/00; B28B 7/34
(52) U.S. Cl. ................. 106/38.51; 106/123.11; 106/123.12
(58) Field of Search .................. 106/38.51, 123.11, 106/123.12

(56) References Cited

U.S. PATENT DOCUMENTS

| | | | | | |
|---|---|---|---|---|---|
| 2,549,822 | A | * | 4/1951 | Euclid | 106/38.51 |
| 3,112,206 | A | * | 11/1963 | Mocsny | 106/38.51 |
| 4,203,771 | A | * | 5/1980 | Matsui | 106/38.35 |
| 5,786,409 | A | * | 7/1998 | Kurple | 523/142 |
| 6,013,116 | A | * | 1/2000 | Major et al. | 44/551 |

* cited by examiner

*Primary Examiner*—David Brunsman

(57) ABSTRACT

A foundry mold and the method of making it is disclosed and claimed. Black liquor is extracted from a pulping process and used as a resin which when combined with an aggregate forms a foundry mold, foundry core or a briquette. The black liquor can be combined with another material to accelerate the cure and to resist moisturization of the mold, core or briquette.

7 Claims, No Drawings

BINDER FOR AGGREGATE, FOUNDRY CORES, AND OTHER PRODUCTS

This application claims the benefit and priority of application Ser. No. 60/351,610 filed Jan. 25, 2002.

FIELD OF THE INVENTION

The present application relates generally to heat-cured binder systems for particulate materials including sand, metallic powders such as those collected in bag houses at steel mills which includes iron ore, minerals, and having particular utility in the manufacture of molds, cores, mandrels, or other shapes which can be used in the production of metal and parts made of metal and non-metal.

BACKGROUND OF THE INVENTION

Related Art

Previously, foundry resins are known in the art and can be used to produce, for example, automobile parts. It also has been demonstrated that the use of lignin, a renewable resource and non-toxic adhesive, in a foundry resin composition can improve processing characteristics and can reduce problematic emissions. See for example Kurple U.S. Pat. Nos. 5,786,409 and 6,040,355.

These patents do not, however, teach the use of a water soluble lignin to further reduce the emissions from the use of the resins in the foundry applications. U.S. Pat. No. 6,013,116 to Major issued Jan. 11, 2000 teaches the use of a form of a water soluble lignin in a binder formulation, however this teaching requires the use of a petrochemical resin, asphalt base for use in this application. Thus, the potential reduction in volatile organic compounds and hazardous air pollutants is lost due to the inclusion of this petroleum based resin. U.S. Pat. No. 4,396,430 teaches the use of a carbohydrate into an aqueous solution of sodium silicate In this case, the reaction between these two components causes a gel to be formed that must be broken down in order for the resin to be dispersed for use in the foundry application. Further, this resin system, in addition, contains ammonia as a volatile component. Therefore, there does not exist a binder for use in industrial applications that has a low VOC and HAP content that can be used to produce a part with the necessary processing and handling characteristics for forming a part.

Therefore, there exists a need for a binder that has the processing characteristics and utilizes non-toxic components enabling reduced levels VOC and HAP to be achieved during its application. This is accomplished in the present invention by utilizing a composition comprising: lignin and carbohydrate in an aqueous solution which can provide the necessary binding and breakdown characteristics to make parts of acceptable performance.

SUMMARY OF THE INVENTION

Volatile organic compounds are defined as organic compounds of carbon excluding carbon monoxide, carbon dioxide, carbonic acid, metallic carbides, metallic carbonates, and ammonium carbonates, having a vapor pressure of 0.02 pounds per square inch absolute or greater at standard conditions, including but not limited to petroleum fractions, petrochemicals, and solvents [Federal Register (CFR) 52.1596]. VOCs are widely used in industrial applications as solvents for their ability to evaporate into the air leaving no residue as in the example of dry cleaning solvent or a thin layer of previously dissolved solids (paints, inks). One significant problem identified with VOCs is their photochemical reaction in the atmosphere in the presence of sunlight that can produce compounds which can reduce visibility and contribute to health effects such as emphysema. Two properties used to protect against the harmful effects of VOCs are the threshold limit value, TLV, and lower explosive limit, LEL. TLV is a determination of toxicity based on the physiological limits of exposure to the compound without adverse effects. The LEL is the lowest VOC concentration at which the mixture can sustain combustion. In typical operations ventilation has to be maintained a VOC concentration beneath this limit. See, Noll, Kenneth E., *Fundamentals of Air Quality Systems Design of Air Pollution Control Devices* American Academy of Environmental Engineers 1999.

At the present time, the foundry industry uses a resin system that is mixed with foundry sand to produce cores and molds which provide the form for molten metal. The purpose of resin is to hold the sand particles together so that the molten metal will surround the core or mold and as the molten metal cools and solidifies, the molten metal acquires a shape that is determined by the core and mold. In the case of the foundry resins, VOCs are used as solvents to help coat the sand initially and leave the resin components on the sand to react and bind the sand together forming a core. In the case of a core, the resin or cured resin product has to hold the sand particles together long enough for the molten metal to set and then the resin or cured resin product has to be able to break down so that the solid core becomes loose sand.

The breakdown of the sand at the appropriate time, is very important, as for example in the case the manufacturing of an exhaust manifold for a vehicle, the core has to break down into loose sand so that the loose sand can be removed by simply shaking the exhaust manifold. If the core remains solid, it requires a considerable amount of time and labor to remove a solid core. This additional cost would make the mass production of these parts impossible because they would be very unprofitable to produce. Also, if any of the sand core remained solid and was not removed, when the finished casting was assembled into its particular use the presence of the solid sand core could cause serious problems in the function of the final assembly. Depending on its use, the presence of an unremoved solid sand core could block the circulation of cooling water in an engine and thereby cause it to overheat and possibly ruin the entire engine. Also, if the solid sand core started to break down after the part was assembled, it could release sand into a precision engine and could ruin the engine. Thus, shakeout or collapsibility, the controlled breakdown of the resin bound sand following the exposure to the molten metal is a key component to the effectiveness of the use of binders in foundry applications.

In the foundry industry, sand cores are typically formed from a mixture containing an aggregate, usually a low cost inorganic material such as sand and a binder. The aggregate and binder are mixed together before the resultant mixture is rammed, blown, or charged to a pattern to form a desired shape and then cured with the use of a catalyst, co-reactant, and/or heat and/or pressure to solid state. (See, for example, U.S. Pat. No. 6,139,619) These binders are used in many applications for binding aggregate and are used in a number of metal casting and steel applications.

The most preferred binder systems in the foundry industry are typically organic binder systems. A specific organic system used as a binder for a variety of applications is the urethane binder. In the "cold box" process, two main components a polyhydroxy component and an isocyanate component are reacted with the use of a gaseous amine catalyst to achieve a curing of the sand core at room temperature.

In the "hot box" process, curing is accomplished by blowing the mixture of aggregate and binder system into a heated pattern. Due to the heat applied to the mixture that is necessary for curing as well as from the heat from the metal pouring, gas is evolved into the environment from the curing and breakdown of the organic binder.

At the present time, the majority of foundry resins are based on phenol formaldehyde resins. These resins have several major drawbacks. One is the presence of unreacted phenol, which is very corrosive to unprotected human tissue. This can cause problems with workers who come into contact with these resins. Perhaps the most serious drawback of these phenol-formaldehyde resins is the presence of free formaldehyde.

When these resins are used, the formaldehyde vapor is noticeable and can be very irritating to eyes and the respiratory tract. It is a well known fact that exposure to formaldehyde is a serious health risk. In fact, OSHA has recently lowered the permissible exposure level of formaldehyde to less than 1 part per million. This is because of the severe health problems associated with formaldehyde. In order to meet these requirements, foundries have to make significant capital investments to remove formaldehyde fumes or use more expensive resins which do not contain formaldehyde. Furthermore, following the pouring of the metal, due to the active components of the resins used to hold the sand together breaks down and can release additional VOC's and HAP's into the workplace environment.

Air pollution control devices are designed to meet government emission standards for particular compounds. Due to capital investment costs, installation costs, maintenance cost, operating and power cost, this method of control is expensive and often times still leads to residual releases of non-regulated substances to the environment. As an alternative to pollution control through the use of add-on devices, in-plant practices can be used to reduce waste by avoiding formation of waste which would eliminate the need for costly treatment and disposal steps. Maximum Achievable Control Technology Standards required by the 1990 Clean Air Act Amendments recommends emission reduction strategies such as raw material substitution or changing processes to reduce emissions and modifying work or operational practices. (Noll, Kenneth E., Fundamentals of Air Quality Systems Design of Air Pollution Control Devices American Academy of Environmental Engineers 1999.)

However, because phenol formaldehyde resins are generally the least expensive resins to use, and by using other resins foundry costs would increase, use of these resins is still prevalent. The use of such resins is disclosed in U.S. Pat. No. 3,409,579.

One raw material substitution approach to this environmental problem has led to the use of inorganic binders. Sodium silicates, water glass, is a common binder used in many foundry applications. This aqueous solution of inorganic compounds addresses the emission problems commonly associated with organic binders by replacing the organic resins with inorganic components which will not break down and release VOC components into the environment in the same way as organic binders will. However, processing problems can arise from the fusion of the sand following exposure to metal pouring temperatures. Poor breakdown of inorganic binders leads to incomplete and inefficient shakeout which can inhibit the productivity of the metal casting operation.

The present invention deals with a material that can be readily used for foundry resins in both cores and molds. This new invention allows the total replacement of the phenol formaldehyde resin which makes the system more economical to use.

The present invention contemplates the process of making foundry molds and cores, the resulting mold and/or core as well as the binder for accomplishing the desired molds and cores. Conventional foundry molding can be used in the invention and the lignin may be sulfate kraft lignin, soda kraft lignin, lignin from a solvent pulping process or lignin derived from a biomass process. As a matter of example the usable lignin may be as derived in U.S. Pat. No. 4,111,928. In general the lignin is dissolved to about 50% by weight in the solvent; however, this may be varied within reasonable limits depending to some degree on the solvent and the molecular weight of the lignin being used. It is preferred in the process of making the cores and molds that the sand particles be intimately mixed with the lignin-solvent mixture before any materials be added which would promote curing or polymerization.

By using a lignin based resin in placed of petroleum based resins such as phenol-formaldehyde resins the emissions of VOC's and HAP's can be drastically reduced.

SUMMARY OF THE INVENTION

It is a principal object of the invention to provide novel binder systems as a substitute for organic and inorganic binder systems known in the prior art.

The novel organic binder and aggregate systems have improved flowability and reduced VOC and HAP emissions and odors.

An object of the present invention is to produce an organic binder system that when mixed with a particulate material can be used to make usable shapes with satisfactory handling and processing properties.

Another object of this invention is to produce an organic binder that when mixed with a particulate material can be used to prepare usable shapes.

Another object of this invention is to produce an array of organic binder systems essentially free of toxic compounds such as phenol and formaldehyde.

Another object of the invention is to produce an array of binder compositions for formed aggregate shapes that exhibit good shakeout or collapsibility properties after exposure to molten metal casting temperatures for easy removal of the formed shape.

Another object of this invention is to produce a binder composition that is heat curable.

It is therefore an additional object of the invention to provide methods of making and methods of using the novel binder systems of the invention to overcome problems associated with the prior art and to form useful cured shapes suitable as molten polymer and metal contacting surfaces, including casting and injection molds, foundry molds, cores, mandrels, and other forms.

DETAILED DESCRIPTION OF THE INVENTION

The compositions of the invention have the advantage of having reduced HAP and VOC emissions and good shakeout characteristics.

In addition, the compositions of the invention have the advantage of avoiding harmful formaldehyde and phenol containing resins to produce adequate hot strength as well as avoiding polyurethane binder systems that can be costly and require the use of sulfur dioxide or amine containing catalysts.

The binder system is a derivative of a renewable resource which provides significant supply and cost advantages. One source that the present invention can be obtained from is the pulping process. The binder in this present invention can be derived from the soda pulping process. The soda pulping process is an environmentally benign process in comparison to previous pulping processes. In this process, a spent liquor is produced following cooking wood chips in the presence of sodium carbonate and separating the wood fibers from the other components. Canadian Patent No. 1,042,159 (Temler, 1978). Additionally, the wood chips or sodium carbonate solution may utilize steam as well as sodium hydroxide in combination with the sodium carbonate to increase the effectiveness of the overall process U.S. Pat. No. 3,954,553 (Dillard et al., 1976). The spent liquor from this semi-chemical process yields a source of materials that can be utilized in the present invention.

The Kraft pulping process may also be used to supply kraft lignin for use in this invention.

The binder system of the present invention also has the advantage of being miscible with water. This reduces the cost and threat of handling other petrochemical based resins which must be handled with great care to reduce the threat of occupational exposure as well as to protect from other potential sources of ignition.

The binder comprises a first part: a) a water-soluble form of lignin; b) reducing sugar; c) short chain carboxylate; and d) water. The first part of the binder is derived from a waste stream in the pulping process and may be in liquid form. If the first part of the binder is not in liquid form, then it must be used in conjunction with a liquid second part. The binder may be used in conjunction with an aggregate to form a mold or core for use in the foundry industry. Additionally, the first part of the binder may be used in conjunction with an aggregate to form a briquette having metallic particles therein.

Optionally, the binder may comprise a second part comprising hydrated lime $Ca(OH)_2$ or quick lime, $CaO$. The second part may be a liquid or a solid. Alternatively, other salts, drying aids, or precipitating agents may be used including but not limited to Magnesium Hydroxide $Mg(OH)_2$, Magnesium Oxide, $MgO$, Calcium Chloride, $CaCl_2$ Magnesium Chloride, Magnesium Sulfate, $Mg(SO_4)$, Portland Cement, Gypsum and Calcium Sulfate. Alternatively, other salts, drying aids, or precipitating agents may be used including but not limited to Magnesium Hydroxide $Mg(OH)_2$, Magnesium Oxide, $MgO$, Calcium Chloride, $CaCl_2$ Magnesium Chloride, Magnesium Sulfate, $Mg(SO_4)$, in order to increase the rate of dehydration and the binding action between the resin and the sand in order to increase the rate of dehydration and the binding action between the resin and the sand. Optionally, a surfactant may be used.

The amount of lignin in the resin can range from 1%–50% by weight. The preferred range of the lignin in the resin will be 25% by weight of the solids. The solid elements in the first part are: lignin; sodium acetate; polysaccharides: xylose, and glucose; and, short chain carboxylates: sodium formate, sodium succinate and sodium lactate.

The binder system composition is mixed with an aggregate. The binder level may be 1–15% of the composition by weight and, preferably, the binder will be in the range of 2–8% of the composition by weight. The composition is mixed to form a shape and is cured in a conventional hot box or with agglomeration equipment. The ratio of the first part to the second part is between the range of 1:1 to 1:10, preferably 2:5. Preferably, the resin is thoroughly mixed with the aggregate.

Hot box, warm air/warm box, baking in a conventional oven and microwave, are all methods which can be used to cure the mixture of the binder system and aggregate. The binder exhibits good strength and has significantly reduced HAP and VOC emissions.

The aggregate can be any conventional aggregate used in the steel, metalcasting, or any refractory used in making shapes from refractory materials. Silica sand, zircon, olivine, alumino-silicate, chromite sand, and the like. Sand used for die casting has a fineness of 70 to 105. For making preforms, the preferred level of binder is 4–18 weight percent.

The curing time depends on the temperature and the equipment used.

EXAMPLES 1–4

A mixture containing silica sand and binder were formulated by first mixing the Part I (first part) with the silica using a Paddle mixer. In samples containing a Part II (second part) resin, the second part was added to the aggregate—first part resin mixture and then mixed using a Paddle mixer.

The mix was then added to a mold heated to a temperature 200 degrees C. and put under pressure to make test specimens. The test specimens were kept at this temperature for 90 seconds.

The tensile strength of dog bone briquettes was measured with a Dietert Tensile Tester (410-04 X10). The tensile strength was measured after 5 minutes elapsed from when the test specimens were removed from the mold and additionally at the time when the dog bones had cooled to room temperature (28 degrees Celsius). Wedron Silica Sand 730 was used in all the examples.

Test Conditions

Example 1

Aggregate: Silica Sand (1000 parts)
Part I (first part)—Lignin Resin (45 parts)

Example 2

Aggregate: Silica Sand (1000 parts)
Part I (first part)—Lignin Resin (25 parts)
Part II (second part)—Calcium (17.5 parts)

Example 3

Aggregate: Silica Sand (1000 parts)
Part I (first part)—Lignin Resin (50 parts)
Part II (second part)—Calcium Hydroxide (20 parts)

Example 4

Aggregate: Silica Sand (1000 parts)
Part I (first part)—Lignin Resin (25 parts) and Molasses (25 parts)
Part II (second part)—Calcium Hydroxide (20 parts)

| TENSILE STRENGTH (psi) | | |
| --- | --- | --- |
| Example | 5 min | Room Temp |
| 1 | 48 | 78 |
| 2 | 81 | 126 |
| 3 | 60.5 | 75 |
| 4 | 50 | 106 |

Example 5

Aggregate: 100 grams Basic Oxide Furnace Dust, Millscale, Sludge, and Metal Oxide Fines Binder: Part I (first part) 11.89 grams Lignin Resin Part II (second part) 4.5 grams MR-200 Calcium Hydroxide The aggregate and Part I Resin were mixed together for approximately one minute. The Part II (second part) powder was then added and mixed for approximately one minute. The aggregate and mixture was into a dogbone mold and put under pressure. After 1 minute the form was demolded. The part was then observed to pass the drop test by remaining completely intact.

The foregoing invention has been set forth by way of example only. Many changes may be made to the binder compositions disclosed herein as well as the methods disclosed herein without departing from the spirit and scope of the claimed invention.

We claim:

1. A binder composition comprising: a first part, said first part comprises: a) lignin; b) sugar; c) short chain carboxylate; d) water, in combination with an aggregate and a dehydration element selected from the group of hydrated lime Ce(OH)$_2$, quick lime, CaO, Magnesium Hydroxide Mg(OH)$_2$, Magnesium Oxide, MgO, Anhydrous Calcium Chloride, CaCl$_2$, Magneseum Chloride, MgCl$_2$, or other salts or dehydration elements and not petrochemical resins.

2. A binder composition as claimed in claim 1 further comprising a surfactant.

3. A mold, core, or part for use in the foundry industry comprising the binder of claim 1 and an aggregate.

4. A binder composition comprising: a first part, said first part comprises: a) lignin; b) sugar; c) short chain carboxylate; d) water; further comprising a surfactant and not petrochemical resins.

5. A mold or core for use in the foundry industry comprising a binder and an aggregate; said binder includes a) lignin, b) sugar, c) short chain carboxylate, d) water; and sand binder does not include petrochemical resins.

6. A process for making a foundry mold comprising the steps of: combining a binder composition comprising: a first part, said first part comprises: a) lignin; b) sugar; c) short chain carboxylate; d) water, and not petrochemical resins which may contain or release volatile organic compounds or hazardous air pollutants, with aggregate, mixing the combined binder and aggregate mixture, and forming a foundry mold.

7. A process for making a briquette comprising the steps of:

combining a binder composition comprising: a) lignin; b) sugar; c) short chain carboxylate; d) water, and not petrochemical resins which may contain or release volatile organic compounds or hazardous air pollutants, with metallic particulates, mixing the combined binder and particulate mixture, and forming a briquette.

* * * * *